(12) United States Patent
Becker et al.

(10) Patent No.: US 8,321,066 B2
(45) Date of Patent: Nov. 27, 2012

(54) METHOD FOR DETERMINING FREE SPACES IN THE VICINITY OF A MOTOR VEHICLE, IN PARTICULAR IN THE VICINITY RELEVANT TO THE VEHICLE OPERATION

(75) Inventors: Jan-Carsten Becker, Palo Alto, CA (US); Michael Hoetter, Gehrden (DE); Thorsten Ike, Hannover (DE); Baerbel Grabe, Stadthagen (DE); Andreas Simon, Woltenbüllel (DE)

(73) Assignee: Robert Bosch GmbH, Stuttgart (DE)

( * ) Notice: Subject to any disclaimer, the term of this patent is extended or adjusted under 35 U.S.C. 154(b) by 671 days.

(21) Appl. No.: 12/431,719

(22) Filed: Apr. 28, 2009

(65) Prior Publication Data

US 2009/0299547 A1 Dec. 3, 2009

(30) Foreign Application Priority Data

Apr. 28, 2008 (DE) .......................... 10 2008 001 409

(51) Int. Cl.
*G08G 1/16* (2006.01)
(52) U.S. Cl. .............................. 701/1; 701/300; 701/301
(58) Field of Classification Search ...... 701/1, 300–302, 701/23–25; 180/167–168; 340/932.2, 435–436; 705/16
See application file for complete search history.

(56) References Cited

U.S. PATENT DOCUMENTS

| | | | | |
|---|---|---|---|---|
| 5,530,420 A | * | 6/1996 | Tsuchiya et al. | 340/435 |
| 6,069,581 A | | 5/2000 | Bell et al. | |
| 7,239,252 B2 | * | 7/2007 | Kato | 340/932.2 |
| 2005/0192749 A1 | | 9/2005 | Flann et al. | |
| 2006/0235610 A1 | | 10/2006 | Ariyur et al. | |

FOREIGN PATENT DOCUMENTS

| | | |
|---|---|---|
| DE | 10 2004 007 553 | 9/2005 |
| DE | 10 2004 047 130 | 4/2006 |
| DE | 10 2004 056 120 | 5/2006 |
| DE | 10 2005 026 386 | 12/2006 |
| DE | 10 2006 046 903 | 4/2008 |
| DE | 10 2006 047 131 | 4/2008 |
| EP | 0 913 751 | 5/1999 |
| EP | 1 065 520 | 1/2001 |
| EP | 1 559 613 | 8/2005 |
| EP | 1 731 922 | 12/2006 |

* cited by examiner

*Primary Examiner* — Yonel Beaulieu
(74) *Attorney, Agent, or Firm* — Kenyon & Kenyon LLP

(57) ABSTRACT

A method and system for determining free spaces in the vicinity of a motor vehicle, in particular a vicinity relevant to the vehicle operation, is provided. A method and system for determining an evasion trajectory for a driver assistance system of the motor vehicle is provided in which information from at least one object detection sensor of the motor vehicle about at least one detected object is used while taking the characteristics of the physical measuring principle of the at least one object detection sensor into account. A method and system is provided in which it is taken into account that the at least one object detection sensor has the capability of directly detecting a plurality of objects by a single measurement.

11 Claims, 3 Drawing Sheets

METHOD FOR DETERMINING FREE SPACES IN THE VICINITY OF A MOTOR VEHICLE, IN PARTICULAR IN THE VICINITY RELEVANT TO THE VEHICLE OPERATION

CROSS-REFERENCE TO RELATED APPLICATIONS

The present application claims priority to German Application No. 10 2008 001 409.5, filed in the Federal Republic of Germany on Apr. 28, 2008, which is expressly incorporated herein in its entirety by reference thereto.

FIELD OF THE INVENTION

The present invention relates to a method for determining free spaces in the vicinity of a motor vehicle, in particular in the vicinity relevant to the vehicle operation. In addition, the present method relates to a method for collision avoidance for a motor vehicle. In addition, the present invention relates to a computer program, a computer program product and a device for executing and implementing such methods.

BACKGROUND INFORMATION

Previously known sensors for sensing the environment for motor vehicles typically record only locations or objects in the vehicle surroundings, i.e., occupied spaces, but not explicitly the free, i.e., unoccupied, spaces in the vehicle vicinity. However, for driver assistance systems, which automatically evade obstacles (for instance by taking a previously determined evasion trajectory into account), the passability of areas is of relevance, as well. In principle, areas in which no objects were detected are not necessarily unoccupied, i.e., available for driving; instead, explicit knowledge regarding the passability is generally lacking in these regions or spaces.

German Document No. DE 10 2004 056 120 A1 relates to a method for collision avoidance or for mitigating the consequences of a collision while driving, when a motor vehicle is approaching an obstacle, in particular a preceding vehicle.

In German Document No. DE 10 2005 026 386 A1, a method and a device for determining free spaces in the vicinity of a motor vehicle are described.

SUMMARY

Embodiments of the present invention provide a method for determining free spaces in the vicinity of a motor vehicle, e.g., in the vicinity relevant to the vehicle operation, especially for determining an evasion trajectory for a driver assistance system of the motor vehicle, in which method information from at least one object detection sensor of the motor vehicle about at least one detected object is used while taking the characteristics of the physical measuring principle of the at least one object detection sensor into account, and in which method it is additionally taken into account that the at least one object detection sensor has the capability of directly detecting a plurality of objects with the aid of a single measurement, has the advantage that information about the free spaces or the passability of areas in the vehicle vicinity are able to be derived in a simple manner from the measurements of the locations or objects. That is, the free space information is estimated, so to speak, from the object detections. This is possible for particular types of sensors when taking their particular measuring principle into account. The determined passability data can then be made available to driver assistance systems, which automatically evade obstacles with the aid of an evasion trajectory. It is also advantageous that the derivation of the free space information takes into account that the object detection sensor is able to detect a plurality of objects in one optical beam.

Certain sensors have the capability of targeting multiple targets in a single measurement, i.e., a plurality of objects or targets are able to be directly detected by a single measurement. For example, a laser beam of a sensor widens in the distance so that an object that is situated only partially inside the beam will also cover the beam only partially, so that objects possibly located behind it are likewise detectable, if necessary. Furthermore, optical beams are able to penetrate windows of motor vehicles, for example, and are thus also able to detect objects located behind the windows. This may have an adverse effect on the free space information contained in a measurement or its information content because of the objects located in front. For this reason it is advantageous if an estimation is performed regarding or for the fact that the information about free spaces included in a single measurement of the object-detection sensor is adversely affected by objects that are located or lying between the at least one object detection sensor and the particular free spaces, as in embodiments of the present invention.

According to embodiments of the present invention, a system-dependent or system-controlled detection capacity of the at least one object detection sensor may also be taken into account. This is possible if it is known in advance how high the detection capacity of the sensor is at a particular location within its detection range. For example, the detection capacity may decrease with increasing distance or at the edge of the detection range. This detection capacity as a function of the sensor system may be determined in advance by experiments, in particular by measuring the detection field, and be stored in a list. Moreover, a model for the detection capacity as a function of the sensor system may be set up, and the detection capacity be determined accordingly based on the model during the run time or during the operation.

In embodiments of the present invention, at least one object detection sensor is able to be implemented as lidar sensor. As an alternative or in addition, at least one object detection sensor may be implemented as video sensor. Other types of sensor may naturally be used as well. By appropriate modification, it is possible to use both a plurality of sensors and combinations of different sensors.

In embodiments of the present invention, in the case of certain sensors, e.g., video sensors, and using mutually independent methods of pattern detection, it is possible to detect both objects, i.e., regions or spaces in which motor vehicles are unable to drive, as well as free areas, i.e., spaces available to vehicle traffic, based on the same video image. Other sensors measure only the object position directly via the propagation time of the laser beam with respect to an obstacle (e.g., lidar sensors). However, from the physical measuring principle of the particular sensor it can be derived with a certain degree of confidence that the path (and thus the area that the laser beam sweeps or traverses) to the obstacle is unoccupied. This is relatively clear when a sensor is able to detect precisely one obstacle. However, according to the present invention it is additionally taken into account that the sensor is able to detect multiple objects.

In embodiments of the present invention, it is possible to assign probability values for the unoccupied state of the particular area or space to the spaces in the vicinity of the motor vehicle. Furthermore, the areas in the vicinity of the motor vehicle may be subdivided into individual cells to which separate probability values for the non-occupied state of the particular cell are assigned.

An embodiment of the present invention provides a method for collision avoidance for a motor vehicle, in which a driving maneuver of the motor vehicle for evasion purposes is implemented autonomously or semi-autonomously or suggested in response to the approach of an obstacle during the ride, the driving maneuver being based on a collision-avoiding evasion trajectory, which is determined while taking into account free spaces determined with the aid of one or more of the methods for determining free spaces in the vicinity of the motor vehicle.

An embodiment of the present invention provides a computer program having program code means and a computer program product having program code means, which are stored on a computer-readable data carrier, in order to execute the methods according to the present invention.

An embodiment of the present invention provides a computer program having program code means in order to carry out a method for determining free spaces in the vicinity of a motor vehicle, the program being executed on a microprocessor of a microcomputer.

An embodiment of the present invention concerns a device, especially a driver assistance system of a motor vehicle, for carrying out the methods according to the present invention. For example, a device, such as a driver assistance system of a motor vehicle, is provided for implementing a method according to the present invention, the device having at least one object detection sensor for detecting objects or obstacles in a vicinity of the motor vehicle, and a control device which is connected to the at least one object detection sensor and which is designed to execute a computer program. For example, the computer program is executed on a microprocessor of a microcomputer.

An embodiment of the present invention provides a method for determining free spaces in the vicinity of the motor vehicle, in particular in the vicinity of the motor vehicle relevant to the vehicle operation. In an embodiment of the present invention, the method for collision avoidance for a motor vehicle is realized as a computer program on a control device of a driver assistance system of a motor vehicle. Other approaches are naturally conceivable as well. For this purpose, for example, the computer program is stored on a memory element of the control device. The method is implemented by execution on a microprocessor of the control device. The computer program may be stored on a computer-readable data carrier (diskette, CD, DVD, hard drive, USB memory stick, memory card or the like) or an Internet server as a computer program product and may be transmitted from there to the memory element of the control device.

Advantageous embodiments and refinements of the present invention are derivable from the embodiments described herein.

DESCRIPTION OF EXEMPLARY EMBODIMENTS

Figure 1:
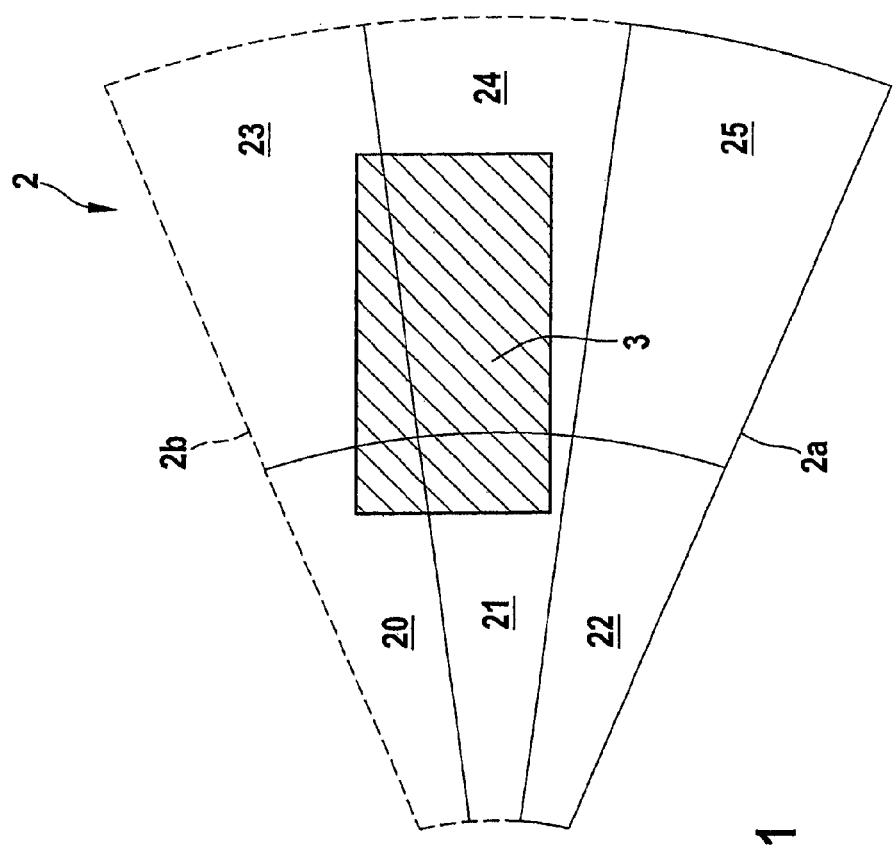
FIG. 1 shows a simplified schematic representation of a motor vehicle in which a method according to the present invention is implemented.
Figure 1:
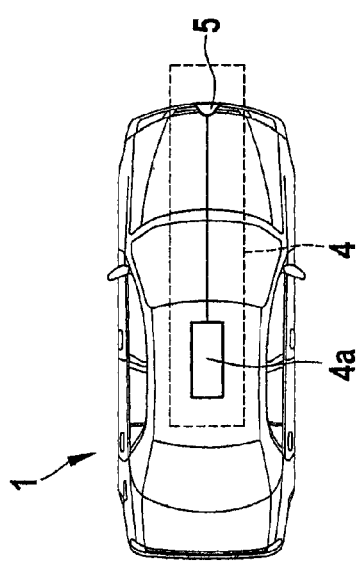
Figure 2:
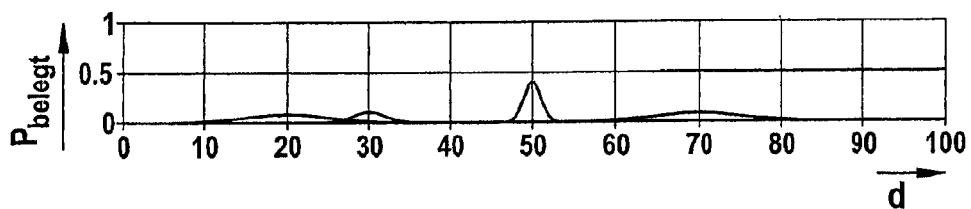
FIG. 2 shows a first diagram regarding a specific development of the method according to the present invention.

FIG. 1 shows a motor vehicle 1 in which the method according to the present invention for determining free spaces 2a in the vicinity 2 of motor vehicle 1, in particular in the vicinity relevant to the vehicle operation, is implemented, especially for determining an evasion trajectory. This may be done within the framework of a method for collision avoidance for motor vehicle 1, in which a driving maneuver of motor vehicle 1 for avoidance is implemented autonomously or semi-autonomously or proposed during the ride in response to the approach of an object or obstacle 3 situated in an occupied space 2b. The driving maneuver is based on a collision-avoiding evasion trajectory, which is determined taking free spaces or free regions 2a into account, which are detected with the aid of the method for determining free spaces 2a in vicinity 2 of motor vehicle 1. On this basis, a device for implementing the method according to the present invention, designed as driver assistance system 4, is able to assist the driver in the evasion of obstacles 3, and in the event of an imminent collision can guide him autonomously or semi-autonomously to a safe trajectory that does not collides with any of obstacles 3 surrounding host motor vehicle 1. This may take place, for one, by displaying a corresponding warning or, for another, by an active intervention of driver assistance system 4 by a corrective braking intervention via a selective increase in the brake force or by a corresponding steering intervention via a steering system of motor vehicle 1.

Motor vehicle 1 or driver assistance system 4 is equipped with a lidar sensor 5 as sensor system or object detection sensor sensing the environment, so as to detect the traffic situation or vicinity 2 of motor vehicle 1 with the aid of measuring technology. In another exemplary embodiment, the object detection sensor could also be implemented as video sensor 5 (e.g., CCD sensor or the like). Other types of sensor may of course be used, as well. By appropriate modification, it is possible to use both a plurality of sensors and combinations of different sensors. In other exemplary embodiments, an environmental sensor system for detecting the traffic situation in the rear of motor vehicle 1 could also be provided.

Lidar sensor 5 is connected to a control device 4a of driver assistance system 4, which also has an evaluation module. With the aid of control device 4a, it is possible to detect objects or obstacles 3 because of the sensor signals from lidar sensor 5. Within the framework of driver assistance system 4, the method for collision avoidance for motor vehicle 1 now runs on control device 4a; in the process, an evasive driving maneuver of motor vehicle 1 is implemented autonomously or semi-autonomously if an obstacle 3 is approaching during the ride, or it is suggested to the driver or additional vehicle systems via a warning device. The driving maneuver is based on a collision-avoiding evasion trajectory, which is determined while taking free spaces 2a into account, which are ascertained with the aid of the method for determining free spaces 2a in vicinity 2 of motor vehicle 1. In an embodiment, information from lidar sensor 5 of motor vehicle 1 regarding detected object 3 is used in the process, taking the characteristics of the physical measuring principle of the utilized lidar sensor 5 into account, and additionally considering that lidar sensor 5 is able to directly detect a plurality of objects 3 by a single measurement.

The method according to the present invention is applied within a framework in which knowledge about the state of vicinity 2 of motor vehicle 1 relevant for the vehicle operation is stored in the form of probabilities for the occupied or unoccupied state of spaces or regions 2a, 2b. Thus, individual probability values for the non-occupied or unoccupied state of the particular space 2a, 2b are able to be assigned to spaces 2a, 2b in vicinity 2 of motor vehicle 1. In the present exemplary embodiment, spaces 2a, 2b in vicinity 2 of motor vehicle 1 are subdivided into individual cells 20 through 25 to which individual probability values $p_{unoccupied}$ are assigned for the unoccupied state of the particular cell 20 through 25. $P_{occupied}$ denotes the probability of particular cells 20 through 25 being occupied.

In this context the following applies:

$$P_{occupied}(x) + P_{unoccupied}(x) \leq 1, \quad (2.1)$$

or, more precisely:

$$P_{occupied}(x) + P_{unoccupied}(x) + P_{unknown}(x) = 1, \quad (2.2)$$

x possibly being a scalar or vector, and denoting the position of region or area 2a, 2b or, in this instance, cell 20 through 25, in space. Hereinafter, for the sake of simplicity, a scalar position is assumed without restricting the universality. Furthermore, $P_{unknown}$ denotes the detection uncertainty. Lidar sensor 5 is able to detect occupancies of spaces 2a, 2b in the form of an object or obstacle detection. Lidar sensor 5 itself does not provide information about the free space or free region 2a within its detection range, i.e., $P_{unoccupied}=0$ applies to the direct measurement of lidar sensor 5. This method now provides a calculation rule by which, utilizing knowledge about the measuring method, the probability is derived as to which region 2a, 2b is unoccupied, i.e., passable, within the detection range. It is known in advance how good the detection capacity of lidar sensor 5 is at a specific location within its detection range.

This is described by the sensor-system-related detection capacity $p_{sys}(x)$ with $0 \leq p_{sys}(x) \leq 1$ for each location or each cell 20 through 25 within the detection range. The maximum estimation of the information content of a measurement with regard to the free space information follows directly from equation 2.1:

$$P_{unoccupied}(x) \leq 1 - P_{occupied}(x). \quad (2.3)$$

Lidar sensor 5 has multi-target capability in a single measurement, i.e., a plurality of objects 3 is able to be detected directly by a single measurement. Therefore, the estimation then takes place that the free space information contained in a measurement is reduced by the objects 3 situated in front:

$$P_{unoccupied}(x) \leq 1 - P_{occupied}(x). \quad (2.4)$$

Taking the system-controlled detection capacity $p_{sys}(x)$ with regard to the detection of free spaces 2a into account, the following ultimately results:

$$P_{unoccupied}(x) \leq P_{sys}(x)\left(1 - \max_{0 \ldots x}(P_{occupied}(x))\right). \quad (2.5)$$

Figure 3:
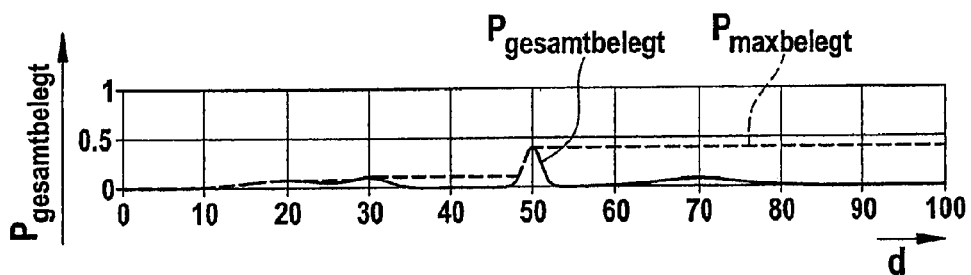
FIG. 3 shows a second diagram regarding a specific development of the method according to the present invention.
Figure 4:
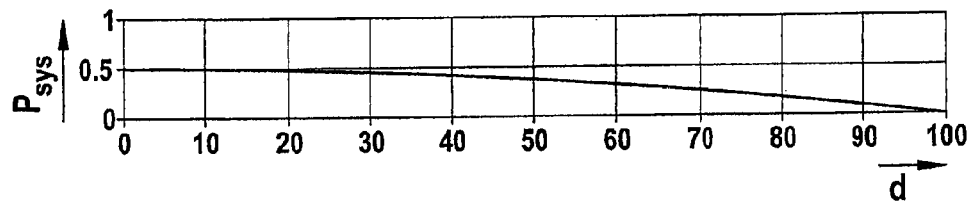
FIG. 4 shows a third diagram regarding a specific development of the method according to the present invention.
Figure 5:
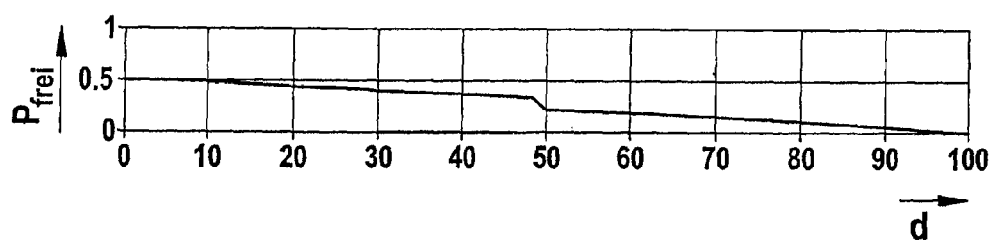
FIG. 5 shows a fourth diagram regarding a specific development of the method according to the present invention.
Figure 6:
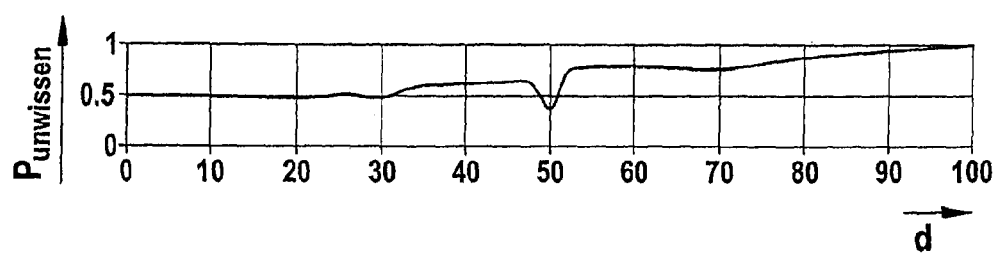
FIG. 6 shows a fifth diagram regarding a specific development of the method according to the present invention.

FIGS. 2 through 6 show a numerical example for the corresponding probability values. First, occupancy probabilities $P_{occupied}$ of the exemplary single detections of a measurement over distance d can be gathered from FIG. 2. FIG. 3 shows resulting overall occupancy probability $P_{overall\,occupied}$ of the measurement and also, illustrated as superposed dashed line in the same diagram, $\max(p_{occupied}(x)) \cdot p_{sys}(x)$ is indicated in FIG. 4, the curve in this case being assumed to be a quadratically declining characteristics curve by way of example. From this, the result for $p_{unoccupied}$ comes about according to equation 2.5, which is shown in FIG. 5. Finally, it may also be of interest to calculate entire detection uncertainty $p_{unknown}$ of a measurement according to equation 2.2 (cf. FIG. 6).

The method according to the present invention for determining free spaces 2a in vicinity 2 of motor vehicle 1, in particular the vicinity relevant to the vehicle operation, and the method according to the present invention for collision avoidance for motor vehicle 1 is realized in the form of a computer program of control device 4a of a driver assistance system 4 of motor vehicle 1, but other approaches are naturally conceivable as well. For this purpose, the computer program is stored on a memory element of control device 4a. The method is executed by processing on a microprocessor of control device 4a. The computer program may be stored on a computer-readable data carrier (diskette, CD, DVD, hard drive, USB memory stick, memory card or the like) or an Internet server as a computer program product and may be transmitted from there to the memory element of control device 4a.

What is claimed is:

1. A computer-implemented method for determining free spaces in the vicinity of a motor vehicle, comprising:
   obtaining, by a processor of a computer, information about at least one free space located in the vicinity of the motor vehicle from a measurement taken by at least one object detection sensor of the motor vehicle; and
   using, by the processor, the information from the at least one object detection sensor to calculate at least one probability of a non-occupied state for the least one free space, while taking at least one characteristic of a physical measuring principle of the at least one object detection sensor into account;
   wherein the processor takes into account that the at least one object detection sensor has the capability of directly detecting a plurality of objects simultaneously.

2. The method as recited in claim 1, wherein the at least one probability of a non-occupied state is calculated while accounting for the fact that the information about the at least one free space is adversely affected by any object lying between the at least one object detection sensor and the respective free space.

3. The method as recited in claim 1, wherein the at least one characteristic of a physical measuring principle of the at least one object detection sensor is taken into account by including a system-controlled detection capacity of the at least one object detection sensor in the calculation of the at least one probability of a non-occupied state.

4. The method as recited in claim 1, wherein the at least one object detection sensor includes a lidar sensor.

5. The method as recited in claim 1, wherein the at least one object detection sensor includes a video sensor.

6. The method as recited in claim 2, further comprising:
   subdividing the at least one free space in the vicinity of the motor vehicle into individual cells; and
   assigning an individual probability value for the non-occupied state of the particular individual cell for each of the individual cells.

7. The method of claim 1, further comprising:
   implementing a driving maneuver of the motor vehicle for evasion purposes autonomously or semi-autonomously or suggesting the driving maneuver in response to the approach of an obstacle, wherein the driving maneuver is based on a collision-avoiding evasion trajectory, which is determined while taking into account free spaces determined in the vicinity of the motor vehicle.

8. A driver assistance system of a motor vehicle, comprising:
- at least one object detection sensor for detecting at least one object and obstacle in a vicinity of the motor vehicle; and
- a control device which is connected to the at least one object detection sensor and which is designed to execute a computer program on a microprocessor of a microcomputer, wherein the computer program, when executed, causes the microprocessor to perform the following:
    - obtaining information concerning at least one free space located in the vicinity of the motor vehicle from a measurement taken by the at least one object detection sensor of the motor vehicle;
    - using the information from the at least one object detection sensor to calculate at least one probability of a non-occupied state for the least one free space, while taking at least one characteristic of a physical measuring principle of the at least one object detection sensor into account; and
    - taking into account that the at least one object detection sensor has the capability of directly detecting a plurality of objects simultaneously.

9. The method as recited in claim 1, wherein the vicinity of the motor vehicle is the vicinity relevant to the vehicle operation.

10. The method as recited in claim 1, wherein an evasion trajectory for a driver assistance system of the motor vehicle is determined.

11. The method as recited in claim 2, further comprising:
- calculating, by the processor, at least one probability value representing a detection uncertainty for the at least one free space, as a function of a corresponding probability of a non-occupied state.

* * * * *